(12) United States Patent
Nijboer et al.

(10) Patent No.: US 8,391,117 B2
(45) Date of Patent: Mar. 5, 2013

(54) QUICK ACCESS TO DISC MANAGEMENT INFORMATION

(75) Inventors: Jakob Gerrit Nijboer, Eindhoven (NL); Pope Ijtsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/597,413

(22) PCT Filed: Jan. 27, 2005

(86) PCT No.: PCT/IB2005/050348
§ 371 (c)(1), (2), (4) Date: Jul. 25, 2006

(87) PCT Pub. No.: WO2005/073971
PCT Pub. Date: Aug. 11, 2005

(65) Prior Publication Data
US 2008/0253244 A1    Oct. 16, 2008

(30) Foreign Application Priority Data
Jan. 30, 2004    (EP) .................................... 04100345

(51) Int. Cl.
*G11B 7/00* (2006.01)

(52) U.S. Cl. .................................................... 369/53.15

(58) Field of Classification Search .................. 369/47.1, 369/47.27, 275.3, 53.1, 53.12, 47.14, 53.15, 369/53.17, 53.24, 53.14, 53.13, 44.32
See application file for complete search history.

(56) References Cited

U.S. PATENT DOCUMENTS

| 5,706,271 | A | * | 1/1998 | Hashimoto | 369/53.37 |
| 6,606,285 | B1 | * | 8/2003 | Ijtsma et al. | 369/47.1 |
| 7,188,271 | B2 | * | 3/2007 | Park et al. | 369/53.17 |
| 7,233,550 | B2 | * | 6/2007 | Park et al. | 369/47.14 |
| 7,272,086 | B2 | * | 9/2007 | Hwang et al. | 369/47.14 |
| 7,313,065 | B2 | * | 12/2007 | Park | 369/53.15 |
| 7,317,670 | B2 | * | 1/2008 | Park | 369/53.15 |
| 7,355,934 | B2 | * | 4/2008 | Park et al. | 369/47.14 |
| 2004/0197103 | A1 | | 10/2004 | Roberts et al. | |
| 2005/0030849 | A1 | | 2/2005 | Park | |
| 2008/0019244 | A1 | * | 1/2008 | Park et al. | 369/47.14 |

FOREIGN PATENT DOCUMENTS

| JP | 2006522508 A | 9/2006 |
| JP | 2007501488 A | 1/2007 |
| WO | 2004029941 A1 | 4/2004 |
| WO | WO 2004059648 A2 * | 7/2004 |
| WO | 2004075180 A1 | 9/2004 |
| WO | 2004090890 A1 | 10/2004 |
| WO | 2005013266 A1 | 2/2005 |
| WO | 2005015558 A1 | 2/2005 |

* cited by examiner

Primary Examiner — Nabil Hindi

(57) ABSTRACT

The invention relates to a method and a recording device for easy and quick access to record carrier management information stored on the record carrier itself. The invention further relates to a record carrier for use in such a method and recording device.

11 Claims, 3 Drawing Sheets

QUICK ACCESS TO DISC MANAGEMENT INFORMATION

Figure 1:
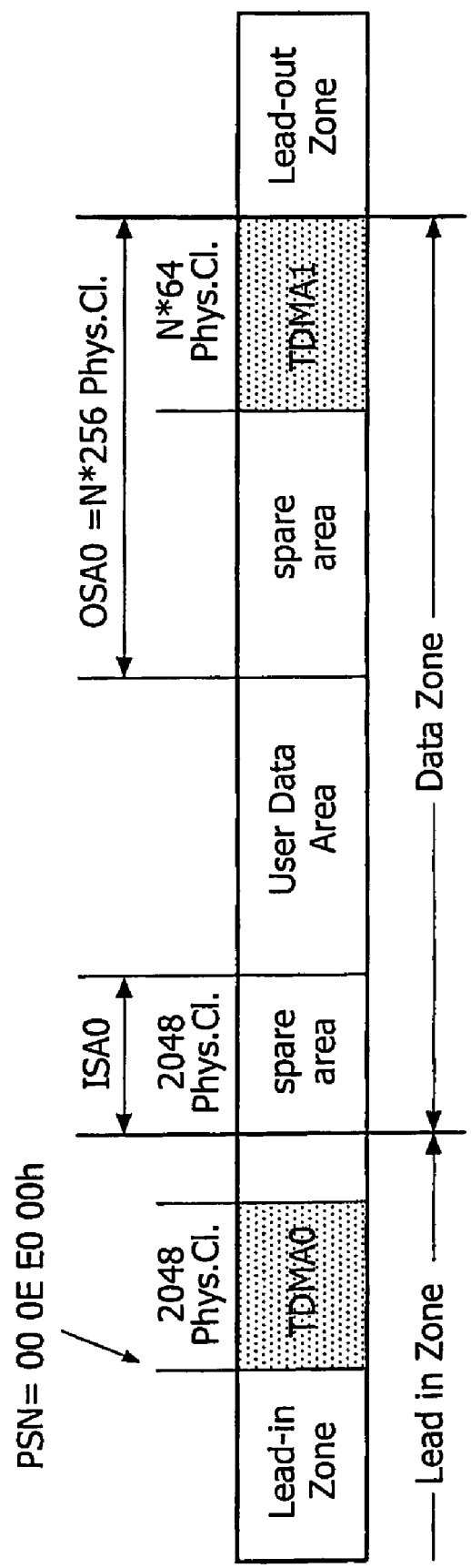

The current invention relates to a method and a recording device for recording information on a record carrier, especially a disc shaped record carrier of the write-once type, said record carrier comprising at least one area for storing disc management information. The current invention further relates to a record carrier, especially a disc shaped record carrier of the write-once type, comprising at least one area for storing disc management information.

Optical recording systems, such as for example Blu-ray Disc, keep track of all sorts of disc management information during recording. Examples of such disc management information that needs to be tracked are the track and session structures of a disc, the location of defective area's on a disc, and the location of recorded and unrecorded areas on a disc. Generally, this disc management information needs to be updated many times during use of a disc. This is especially so in the case of random recording.

For the purpose of storing and updating this disc management information, a special area is generally available on the disc itself. Such a special area is generally located in the Lead-in and/or the Lead-out zone of a disc. This special area may comprise, for example, a Defect List for storing the location of defective areas on a disc (and their replacement area's), and a Space Bit Map for storing the location of recorded and unrecorded areas, such as for example clusters, on a disc. Furthermore, tracks and sessions boundaries may be registered in this special area. In this application such a special area will be referred to as a Temporary Disc Management Area (TDMA).

For a single layer disc (that is, a disc comprising a single information layer for storing the information to be recorded) this TDMA area is generally located in the Lead-in zone, and is referred to as TDMA0. For a dual layer disc (that is a disc comprising two information layers, referred to as layer L0 and layer L1) there is generally the same TDMA0 area located in the Lead-in zone of layer L0, and additionally a second TDMA area, referred to as TDMA1, in the Lead-out zone of layer L1. In the Blu-ray Disc format specification both the TDMA0 and the TDMA1 are specified to have a fixed size of 2048 physical clusters.

Especially for write-once discs, additional TDMA's may be defined to facilitate more storage space for storing the disc management information. These additional areas may be useful when many updates are required, for example in the case of many ejects (possibly after short recordings), or when a more frequent update scheme is desired for more robustness, for example against power failures. In write-once discs the TDMA's cannot be overwritten (in contrast to rewritable discs), and therefore the additional storage space may be required. For example, a single layer write once disc may have, next to its ThDMA0, at least one additional TDMA area (TDMA1 in FIG. 1), while a dual layer write once disc may have, next to its TDMA0 and TDMA1, at least one additional TDMA area on layer L0 and at least one on layer L1. In FIG. 2 these additional TDMA areas are called TDMA2, TDMA3, and TDMA4.

Generally, the TDMA areas are allocated when a disc is initialised, at which time at least one TDMA area (TDMA0) is allocated for a single layer disc, and at least two TDMA areas (TDMA0 and TDMA1) are allocated for a dual layer disc. Generally, the TDMA areas are used sequentially and in the following order:

single layer disc: TDMA0→TDMA1;

dual layer disc: TDMA0→TDMA1→TDMA2→TDMA3→TDMA4.

Each TDMA area is generally filled up contiguously.

In a Blu-ray Disc optical recording system the disc management information stored in a TDMA area on a disc is only updated for that parts that has changed. For example, when the Space Bit Map (SBM) of layer L0 (SBM0) has changed and the Space Bit Map of layer L1 (SBM1) has not changed, only the updated Space Bit Map of layer L0 is written into the TDMA. A Temporary Disc Definition Sector (TDDS) contains pointers to the most recent version of the various structures in a TDMA (see FIG. 3). Now, a drive can find the most recent status by accessing the TDDS on a disc, reading the pointers, and subsequently accessing the relevant, and up-to-date, structures, like the SBM0 and the SBM1 shown in FIG. 3. For this reason the last written cluster of a TDMA contains an up-to-date TDDS in a specific location (Data Frame 31 in cluster Z shown in FIG. 3) containing up-to-date pointers to the various structures.

When a disc is inserted into a drive, the drive needs to find the TDMA that is in use as fast as possible. However, this can take some time. For example when the first n TDMA areas on a disc are already filled up and TDMA(n+1) is the TDMA area in use, the drive has to scan all the previous n TDMA areas before arriving at TDMA(n+1). Moreover, this scanning of a sequence of TDMA areas may take a very long time when parts of the sequence of TDMA areas is damaged, and the drive performs several retries before continuing to the next cluster.

It is an object of the present invention to reduce this start-up time, especially when parts of the TDMA areas are damaged. This object is achieved by providing a method and a recording device as described below, and by providing a record carrier for use in the method and recording device according to the present invention.

Both, a single layer disc and a dual layer disc comprise at least one TDMA area, that is the first TDMA area TDMA0. According to a first aspect of the present invention this first TDMA area, TDMA0, comprises signals indicating whether or not the first TDMA area itself and subsequent TDMA areas (in a sequence of TDMA areas) are in use. According to a second aspect of the present invention this first TDMA area, TDMA0, is followed by an area (referred to as Detection Area) which comprises signals indicating whether or not the first TDMA area and subsequent TDMA areas (in a sequence of TDMA areas) are in use. By retrieving information from these signals, a drive can jump directly to the last used TDMA area holding the most up-to-date disc management information. Now only information from the first TDMA area (that is, TDMA0) or the Detection Area needs to be retrieved, while all TDMA areas between this first TDMA area and the TDMA area holding the most up-to-date disc management information can be skipped.

In a preferred embodiment the signals are in the form of the presence or absence of a high frequency (HF) mark. The indication used is the presence of a high frequency (HF) for a corresponding TDMA area in use on the disc. Now, the data content of the first TDMA area itself is not relevant for the detection.

Figure 2:
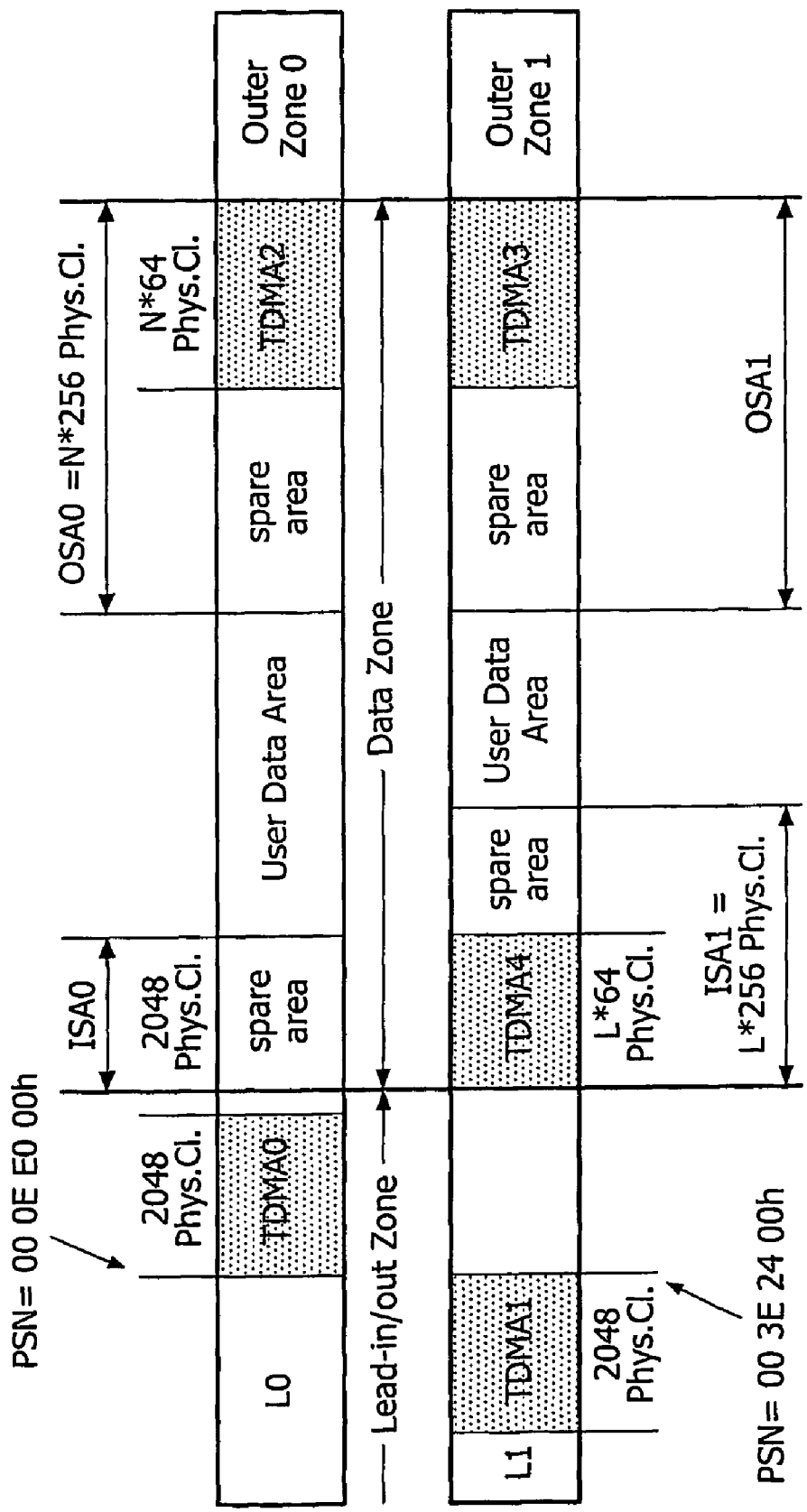
Figure 3:
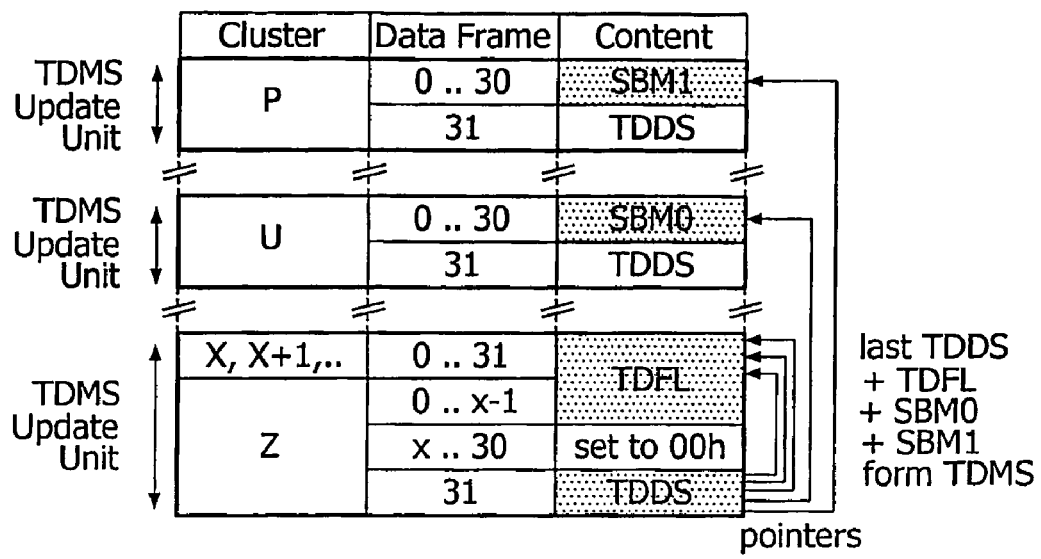
Figure 4:
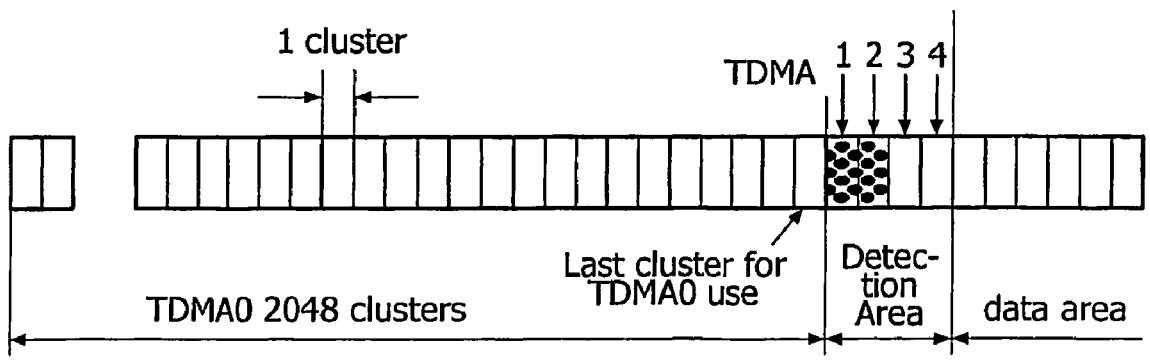

The features and advantages of the present invention will be apparent from the following more particular description of embodiments of the invention as illustrated in the accompanying drawings, where FIG. 1 shows an example of the locations of TDMA areas on a single layer disc, FIG. 2 shows an example of the locations of TDMA areas on a dual layer disc, FIG. 3 shows an example of information clusters written in the TDMA showing a TDDS in the last cluster, and FIG. 4 shows an example of a detection area with up to TDMA2 in use.

FIG. 1 shows by way of example a single layer write once disc. This disc has, next to its TDMA0, an additional TDMA1 area located at the outer side of the Outer Spare Area 0 (OSA0). FIG. 2 shows by way of example a dual layer write once disc having, next to its TDMA0 and TDMA1, one additional TDMA area on layer L0 and two additional TDMA areas on layer L1. These additional TDMA areas are called TDMA2, TDMA3, and TDMA4, and are located in the Outer Spare Areas OSA0 and OSA1 and in the Inner Spare Area ISA1, respectively.

In these single layer and dual layer discs at least one TDMA area is available, that is TDMA0. In an embodiment of the invention a predefined number of clusters of the at least one TDMA area (TDMA0) is reserved to indicate a filled TDMA. This predefined number corresponds to the number of TDMA areas. In an alternative embodiment the at least one TDMA area (TDMA0) is followed by a Detection Area consisting of a predefined number of clusters reserved to indicate a filled TDMA (see FIG. 4).

FIG. 4 shows part of an information layer L0 of a dual layer disc (as is shown in FIG. 2) where a TDM0 consisting of 1048 clusters is followed by a Detection Area consisting of 4 clusters. The indication used is the presence of a high frequency (HF) indicator for each cluster representing on of the four subsequent TDMA areas (TMDA1 to TDMA4 in FIG. 2). The presence of a high frequency (HF) in a cluster in the Detection area indicates that the corresponding TDMA area (1,2,3 or 4) on the disc is in use. The data content of the clusters in the Detection Area itself is not relevant for the detection. In the example shown in FIG. 4, TDMA2 is the TDMA area currently being used by the drive for TDMA updates, while TDMA0 and TDMA1 are full or cannot be used anymore for some other reason.

The presence of a high frequency (HF) in a cluster may be obtained by writing a pattern of marks in that cluster. The pattern of marks may, for example, represent random information since the information content of a cluster is not relevant for the detection. Now cluster having marks written in it have a high frequency (HF) signal present, while clusters having no marks written in it have no high frequency (HF) signal present When none of the four clusters in the Detection Area are written, that is none of them have a high frequency (HF) indicator, then the TDMA0 is being used. In an alternative embodiment, an additional cluster is added for indicating whether or not the TDMA0 area is being used. In the example above related to the dual layer disc shown in FIG. 2, the Detection Area would consist of five clusters, related to the TDMA areas (0,1,2,3 or 4).

A drive according to the invention can quickly detect the TDMA area in use by jumping to the Detection Area, checking the presence or absence of the high frequency (HF) indicators, and subsequently scanning only the indicated TDMA. In an embodiment only the last written cluster in that TDMA area has to be read to be able to access all disc management information, because this last written cluster contains the Temporary Disc Definition Sector (TDDS).

In a further embodiment the drive can jump directly to the Detection Area because this Detection Area has a fixed address on the disc.

It is noted that the embodiment in which a high frequency (HF) indication is used results in a very robust detection mechanism. This because there is no need to read the correct data content; only the absence of presence of a high frequency (HF) is relevant. This embodiment easily survives scratches, dirt, and other damages to the media. This is especially so when a cluster requires about half a revolution (on the inner diameter) of the disc, which is rarely damaged completely.

It is further noted that the invention is not limited to single layer and dual layer discs only, but that it likewise can be used advantageously in disc comparing any number of information layers for storing the information to be recorded.

The invention claimed is:

1. A record carrier comprising a plurality of Temporary Data Management areas for storing disc management information and a designation area, independent of said slum of Temporary Data Management area, said designation area including a predefined number of clusters, said predefined number corresponding in number to said plurality of Temporary Data Management areas, wherein one of said clusters is associated with a corresponding one of the plurality of Temporary Data Management areas for storing disc management information, wherein signals in the designation area indicate which corresponding one of said plurality of Temporary Data Management areas for storing disc management information is last filled.

2. The record carrier according to claim 1, wherein the designation area is located adjacent to one of said plurality of Temporary Data Management areas for storing disc management information.

3. The record carrier according to claim 1 wherein the signals comprise marks indicating a first status of a corresponding one of the plurality of Temporary Data Management areas for storing disc management information and no marks indicating a second status of a corresponding one of the plurality of areas for storing disc management information.

4. The record carrier according to claim 3, wherein the first status indicates that a corresponding area of said plurality of Temporary Data Management areas for storing disc management information has been filled, and the second status indicates that the corresponding area of said plurality of Temporary Data Management areas for storing disc management information is not filled.

5. A method for recording information on a record carrier, said record carrier comprising plurality of Temporary Data Management areas for storing disc management information and a designation area, independent of said Temporary Data Management areas including a predefined number of dusters, said predefined number of clusters corresponding to a number of said plurality of Temporary Data Management areas, one of said clusters being associated with a corresponding one of the plurality of Temporary Data Management areas for storing disc management information wherein signals in the clusters indicate which of said plurality of Temporary Data Management areas for storing disc management information have been filled, the method comprising the steps of:

accessing the designation area comprising signals indicating which of said plurality of areas for storing disc management information that have been filled, checking each of said signals in said designation area;

determining from said signals the last area for storing disc management information that has been filled, and retrieving the disc management information contained within said determined last area for storing disc management information.

6. The method according to claim 5, wherein the step of accessing the designation area comprising signals indicating which of said plurality of Temporary Data Management areas for storing disc management information have been filled consists of referencing a predefined location on the record carrier.

7. The method according to claim 5, wherein the step of retrieving the disc management information comprises:
   retrieving pointer information from a predefined location in the determined last area for storing disc management information that has been filled, and
   subsequently retrieving the disc management information by using said pointer information.

8. The record carrier according to claim 1, wherein a first one of said plurality of Temporary Data Management areas is contained at a known region of said record carrier.

9. The record carrier according to claim 1, wherein said designation area is contained at a known region of said record carrier.

10. The method according to claim 5, wherein a first one of said plurality of Temporary Data Management areas is contained at a known region of said record carrier.

11. A record carrier comprising at least one layer, each of said at least one layer comprising:
   a plurality of Temporary Data Management areas of a known dimension for storing disc management information and a designation area, independent of said Temporary Data Management area, said designation area including a predefined number of clusters, said predefined number of clusters corresponding in number to said plurality of Temporary Data Management areas, one cluster being associated with a corresponding one of the plurality of Temporary Data Management areas for storing disc management information, wherein signals in the designation area indicate which of said plurality of Temporary Data Management areas have been filled.

* * * * *